US008859928B2

(12) United States Patent
Sommerfeld (10) Patent No.: US 8,859,928 B2
(45) Date of Patent: Oct. 14, 2014

(54) MULTI-STAGE COMPRESSOR IN A PLASMA CUTTER (75) Inventor: Troy A. Sommerfeld, Neenah, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1637 days.

(21) Appl. No.: 12/117,688

(22) Filed: May 8, 2008

(65) Prior Publication Data
US 2009/0159577 A1 Jun. 25, 2009

Related U.S. Application Data (60) Provisional application No. 61/015,175, filed on Dec. 19, 2007.

(51) Int. Cl.
B23K 9/10 (2006.01)
H05H 1/36 (2006.01)

(52) U.S. Cl.
CPC ....................................... H05H 1/36 (2013.01)
USPC ....................... 219/121.39; 219/133; 290/1 A (58) Field of Classification Search
USPC ....... 219/137 PS, 133, 134, 121.55; 290/1 A, 290/1 R, 40 R
See application file for complete search history.

(56) References Cited

U.S. PATENT DOCUMENTS

| 2,410,522 | A | | 11/1946 | Powell | |
|---|---|---|---|---|---|
| 2,423,677 | A | | 7/1947 | Balogh | |
| 4,410,788 | A | * | 10/1983 | Summers et al. | 219/130.1 |
| 4,507,064 | A | * | 3/1985 | Kocher et al. | 418/15 |
| 4,918,285 | A | | 4/1990 | Thommes | |
| 4,943,699 | A | | 7/1990 | Thommes | |
| 5,086,205 | A | | 2/1992 | Thommes | |
| 5,362,207 | A | | 11/1994 | Martin et al. | |
| 5,502,983 | A | * | 4/1996 | Dasher | 62/454 |
| 5,541,857 | A | | 7/1996 | Walter et al. | |
| 5,681,368 | A | | 10/1997 | Rahimzadeh | |
| 6,130,398 | A | | 10/2000 | Schneider et al. | |
| 6,132,117 | A | * | 10/2000 | Fukano et al. | 400/76 |
| 6,220,045 | B1 | | 4/2001 | Kim et al. | |
| 6,220,245 | B1 | | 4/2001 | Takabayashi et al. | |

(Continued)

FOREIGN PATENT DOCUMENTS

| EP | 1082992 A | 3/2001 |
|---|---|---|
| GB | 631194 A | 10/1949 |
| JP | 56052598 A | 5/1981 |
| WO | 2007/113389 A | 10/2007 |

OTHER PUBLICATIONS

U.S. Appl. No. 11/960,425, filed Dec. 19, 2007, Salsich.
U.S. Appl. No. 11/960,494, filed Dec. 19, 2007, Salsich.

(Continued)

Primary Examiner — Brian Jennison
(74) Attorney, Agent, or Firm — Fletcher Yoder P.C.

(57) ABSTRACT

Systems and methods are provided for a torch power system using a multi-stage compressor. In one embodiment, a system includes a torch power unit that includes a compressor having multiple compression stages. A method of operation is provided that includes compressing a gas via a multi-stage compressor in a torch power unit. A method of manufacturing a torch power unit is provided that includes providing a multi-stage compressor for a torch power unit and mounting the multi-stage compressor inside an enclosure of the torch power unit. Another system is provided that includes a plasma cutting circuit, a multi-stage compressor, a motor coupled to the compressor, and a compressor controller.

22 Claims, 4 Drawing Sheets

(56) References Cited

U.S. PATENT DOCUMENTS

| | | | |
|---|---|---|---|
| 6,313,431 B1 | 11/2001 | Schneider et al. | |
| 6,785,980 B1 | 9/2004 | Koelzer | |
| 6,832,900 B2 | 12/2004 | Leu | |
| 6,986,509 B2 * | 1/2006 | Koh et al. | 271/110 |
| 6,989,509 B2 | 1/2006 | Silvestro | |
| 7,022,935 B1 | 4/2006 | Matus et al. | |
| 2001/0042736 A1 * | 11/2001 | Schneider et al. | 219/121.55 |
| 2003/0042237 A1 | 3/2003 | Brofft et al. | |
| 2004/0003853 A1 | 1/2004 | Bankstahl et al. | |
| 2005/0109738 A1 | 5/2005 | Hewett et al. | |
| 2005/0155959 A1 | 7/2005 | Bender et al. | |
| 2005/0201868 A1 | 9/2005 | Gao et al. | |
| 2006/0043083 A1 * | 3/2006 | Bender et al. | 219/133 |
| 2008/0023449 A1 | 1/2008 | Salsich et al. | |
| 2008/0023451 A1 | 1/2008 | Salsich et al. | |
| 2008/0149602 A1 | 6/2008 | Lezner et al. | |

OTHER PUBLICATIONS

U.S. Appl. No. 11/960,514, filed Dec. 19, 2007, Salsich et al.
Millerwelds; Owner's Manual entitled "Spectrum 125C And ICE-12C Torch;" www.millerwelds.com/om/o2248e_mil.pdf; 32 pages.
Millerwelds; Article entitled "Spectrum 125C—The Power of Blue;" issued Mar. 2007; Index No. PC/13.0; www.millerselds.com/pdf/spec_sheets/PC13-0.pdf; 4 pages.
Thomas 2145 WOB-L Piston Series Datasheet; http://www.gd-thomas.com/productList.aspx?id=10284&tp=p;5 pages.
Instruction Manual HD100-300 2-Stage Compressors, B&C Versions; http://www.blackmerpump.com/cbpdf/cb9A-041.pdf; 24 pages.

* cited by examiner

MULTI-STAGE COMPRESSOR IN A PLASMA CUTTER

CROSS REFERENCE TO RELATED APPLICATIONS

This application claims priority to and the benefit of U.S. Provisional Application No. 61/015,175, entitled "Multi-Stage Compressor in a Plasma Cutter," filed Dec. 19, 2007, the disclosure of which is incorporated herein by reference.

BACKGROUND

The invention relates generally to gas compressors, and more particularly to portable torch power systems utilizing an air compressor in a single unit.

A variety of systems use compressed gas (e.g., compressed air). For example, compressed air may be used to power tools, such as wrenches, sanders, spray guns, and so forth. By further example, compressed gas (e.g. air) may be used with various torches, such as a plasma cutting torch. A plasma cutting system creates plasma (e.g., high temperature ionized gas) to cut metal or other electrically conductive material. In general, an electrical arc converts a gas (e.g., compressed air) into plasma, which is sufficiently hot to melt the work piece while the pressure of the gas blows away the molten metal. The power output and flow of the gas can affect the performance of the system.

The compressors in these systems must output a sufficiently high flow rate and pressure of compressed air to power the torch and remove the molten metal or other material being cut. Any reduction in pressure and flow of the air may cause the torch to overheat, cut slower or cut at unacceptable rates, and blow away the molten metal or other material less effectively. Additionally, the efficiency of the compressor can affect the power used by the system and the heat generated by the system, thus impacting operating costs and cooling requirements. Further, excessive heat, vibration, and/or movement of the compressor may damage or prematurely wear adjacent components and/or the compressor itself.

BRIEF DESCRIPTION

In one embodiment, a system is provided that includes a torch power unit. The torch power unit includes a compressor having multiple compression stages.

In another embodiment, a method of operation is provided that includes compressing a gas via a multiple stage compressor in a torch power unit.

In another embodiment, a method of manufacturing is provided that includes providing a multi-stage compressor for a torch power unit, and mounting the multi-stage compressor inside an enclosure of the torch power unit.

In another embodiment, a system is provided that includes a torch power unit. The torch power unit includes a plasma cutting circuit, a multi-stage compressor, a motor coupled to the compressor, and a compressor controller.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
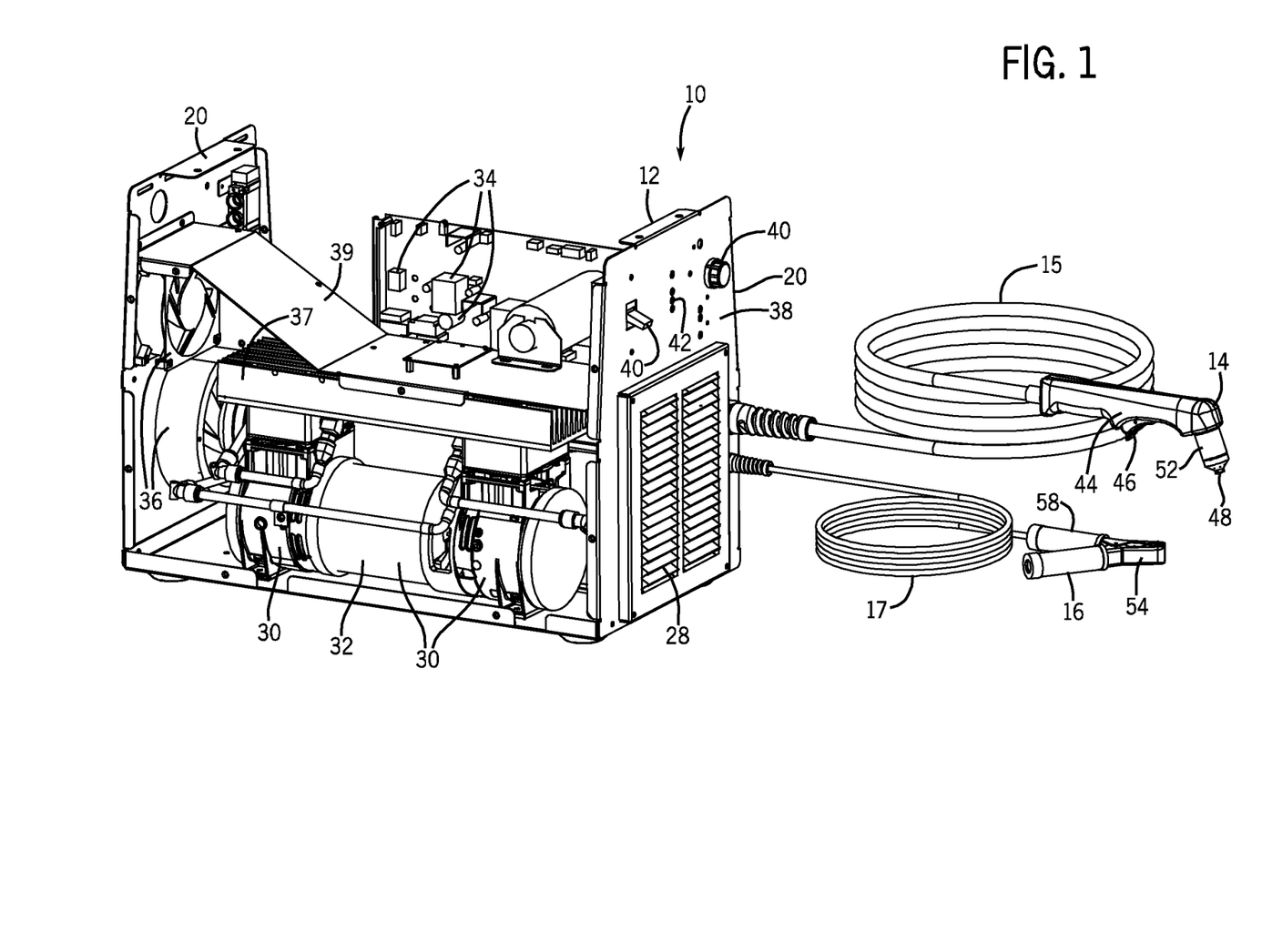
FIG. 1 is a partial perspective view of an exemplary plasma cutting system having a multi-stage (e.g., two-stage) compressor wherein an entire side panel assembly is removed to further illustrate various internal features in accordance with embodiments of the present invention.
Figure 2:
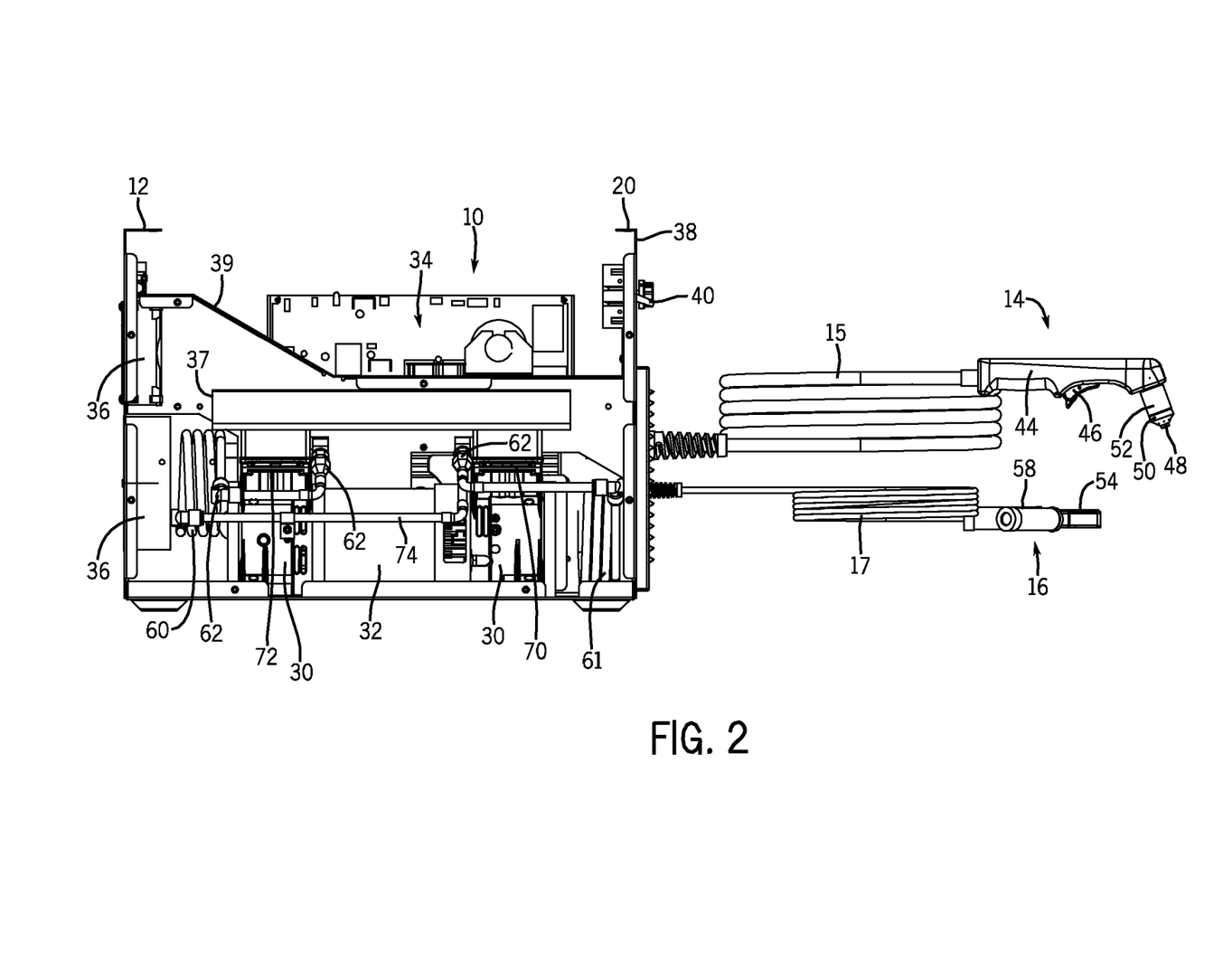
FIG. 2 is side view of the plasma cutting system as illustrated in FIG. 1 wherein compressor housings have been removed to further illustrate internal features of the multi-stage compressor in accordance with embodiments of the present invention.

Referring now to the drawings, FIGS. 1 and 2 are partial perspective views illustrating an embodiment of a portable plasma cutting system 10 having a multi-stage (e.g., two-stage) compressor. Specifically, FIG. 1 illustrates the system 10 with an entire side panel assembly removed to provide a better view of the multi-stage compressor, whereas FIG. 2 illustrates a side view of the system 10 with compressor housings removed to better view components of the compressor. As discussed in further detail below, embodiments of the system 10 may include any welding type apparatus such as a plasma cutting system, welding system, induction heating system etc. that include a multi-stage compressor, such as a two-stage compressor, to provide compressed air to torches, other tools, or other components connected to or disposed in the system 10. A multi-stage compressor, such as a two-stage compressor, compresses a gas in two or more compressor chambers connected in series such that a first compression cycle, a second compression cycle, etc. are executed consecutively. A multi-stage compressor may have a greater efficiency and thus use less power and produce less heat than a conventional single-stage compressor, without sacrificing compressor life and/or durability. Further, multiple stage compressor may be quieter and operate with less vibration and movement then a conventional single-stage compressor.

The illustrated plasma cutting system 10 includes a torch power unit 12 coupled to a plasma torch 14 and a work piece clamp 16 via a torch cable 15 and a work piece cable 17, respectively. The torch power unit 12 may be coupled to a power source (e.g., a power grid or a motor-driven generator) via a power cable (not shown). The power source may provide a pilot current to a cathode, such as a movable electrode, and to the anode, such as the nozzle of the torch 14, that are forced into contact via a spring. After electrical current begins to flow from the electrode to the nozzle of the torch 14, gas or air supplied to the torch 14 counteracts the spring force and moves the electrode away from the nozzle. This breaks the electrical contact between the electrode and the nozzle and creates the pilot arc. Also, as the electrode moves away from the nozzle, it opens a nozzle orifice (connected to the air supply), and a plasma jet is created. The plasma jet causes the arc to transfer (at least in part) to the work piece held by the clamp 16, thus initiating cutting. Electronics in the power source sense when the arc has transferred and then supply a main cutting current of greater amperage after the transfer has occurred. Also, the tip of the torch 14 is disconnected (electrically), interrupting the pilot current path. Thus, the current is used to cut the workpiece, and follows a path including the positive terminal, the workpiece and the electrode. For example, the power unit 12 may be configured to supply a suitable voltage and current to create an electrical circuit from the unit 12, along the cable 15 to the torch 14, across a gap between the torch 14 and a work piece (e.g., as an electrical arc), through the work piece to the clamp 16, and through the cable 17 back to the unit 12. In alternate embodiments, a non-moving electrode torch may be used in which a pilot arc is created via a high voltage and/or high frequency circuit, so that the high voltage may cause the arc to jump from the non-moving electrode to the nozzle. In yet other embodiments, any suitable torch and starting technique may be used.

The power unit 12 includes an enclosure 20 defining a generally closed volume to support various circuits, sensor features, control features, and gas supply features (e.g., air compressor). As discussed in detail below, the illustrated system 10 includes a variety of features to improve portability, serviceability, reliability, and control of the plasma torch 14 and the components within the single enclosure 20 of the system 10. As shown in FIGS. 1-2, the top portion and side portions of the enclosure 20 have been removed to better illustrate the interior components. The illustrated system 10 also may include a handle on the top side of the enclosure 20 to enable easier transportation of the system 10. The enclosure 20 may also include vents 28 to relieve heat and/or pressure inside the system 10. Additional vents may be located on other panels of the enclosure 20.

In accordance with an embodiment of the present invention, the system 10 may include a two-stage compressor 30. The compressor 30 may be powered by a compressor motor 32, such as a DC or AC motor that may include brushed, brushless, switched, reluctance, or any other suitable type of motor. In certain embodiments, the system 10 may include a flow meter, pressure sensor or other sensor configured to monitor output of the compressor 30. The system 10 also may include sensors, such as a pressure sensor, a temperature sensor, or a combination thereof, to provide feedback used to adjust the motor 32, the compressor 30, power electronics 34, or a combination thereof. The power electronics 34 may be configured to condition and provide power to the torch 14 and the compressor 30, and may include transformers, circuit boards, inductors, terminals, capacitors, other electrical components, and/or other components. Multiple fans 36 may also be included inside the system 10 to provide air circulation and cooling to the system 10. Additionally, as depicted in FIG. 2, the fans 36 may be located next to one of the vents 28 to optimize air circulation. Additional fans 36 may be included at other locations inside or outside the enclosure 20. For additional cooling of the compressor 30, a heat sink 37 may be coupled to the top of the compressor 30. The system 10 may also include an airflow director 37 that may form a windtunnel to direct cooling air over the cooling components of the system 10 and to contain dirt and debris drawn in by the cooling fans 36.

In the illustrated system 10, a control panel 38 is included at an end of the power unit 12. The control panel 38 may include various control inputs, indicators, displays, electrical outputs, air outputs, and so forth. In an embodiment, a user input 40 may include a button, knob, or switch configured to enable selection of a mode of operation (e.g., plasma cut, weld, etc.), power on/off, an output current level, a gas (e.g., air) flow rate, a gas (e.g., air) pressure, a work piece type, a control type (e.g., manual or automatic feedback control), or a combination thereof. The control panel 34 may also include various indicators 42 to provide feedback to the user. For example, the indicators 42 may include one or more light emitting diodes (LED) and/or liquid crystal displays (LCD) to display on/off status, current level, voltage level, gas (e.g., air) pressure, gas (e.g., air) flow, environmental conditions (e.g., altitude, temperature, pressure, etc.), or any other parameter. Additionally, the indicators 42 may include an LED or LCD that displays a trouble or warning indicator if there is a problem with the system 10. Embodiments of the control panel 38 may include any number inputs and outputs, such as welding methods, air compressor settings, oil pressure, oil temperature, and system power. For example, the indicators 42 may display an indication of the stage (e.g., one, two, three, etc.) of the compressor 30.

The plasma torch 14 includes a handle 44, a locking trigger 46, a tip 48, a retaining cap 52, as well as an electrode inside the torch 14. The clamp 16 comprises an electrically conductive material clamping portion 54 having insulated handles 58. The system 10 may be configured to work with a variety of sockets or outlets, and the system 10 may receive different power sources, such as AC 50/60 Hz, 400 Hz, single or three phase 120V, 230V, 400V, 460V, 575V, etc. Additionally, the system 10 may include additional components and is not limited to the components illustrated in FIGS. 1-2.

In some embodiments, as mentioned above, the system 10 may provide compressed to other tools or components coupled to the system 10. For example, in such an embodiment, the compressor 30 may provide air to grinders, impact wrenches, nail guns, drills, or any other suitable tool. The system 10 may include a 3-way or 4-way solenoid valve downstream of the compressor 30, such that the compressed air output from the compressor 30 may be directed to the torch 14, another tool, or a combination thereof. In one embodiment having a solenoid valve, one of the user inputs 40 on the control panel 38, e.g., a user interface selector switch, may allow a user to direct the compressor output to the torch 14 or to another tool. Additionally, use of a 4-way valve provides a fourth path for the compressed air output of the compressor. The 4-way valve may divert air to the torch 14, may divert air to another attached tool, and/or may act as an exhaust valve to rapidly decompress air to the torch 14 or tool. In some embodiments, it may be desirable to purge and decompress the pressurized gas feeding the torch or tool as quickly as possible to ensure rapid re-fire of the plasma torch or restart of the tool.

Alternatively, in some embodiments the 3-way or 4-way valve may be configured to sense the attachment of another tool, such as through a sensor that detects a flow or pressure resistance caused by the attached tool. In such an embodiment, the 3-way or 4-way solenoid valve may automatically divert air to the attached tool instead of the torch 14.

Turning now in more detail to FIG. 2, the system 10 includes the fan 36, the gas compressor 30, cooling coils 60 and 61, and pneumatic couplings 62. The compressor 30 may include or may be connected to the DC motor 32 that is connected to power electronics 34 inside the system 10 and that drives the compressor 30. The gas compressor 30 may be rigidly mounted inside the enclosure 20 using compressor mounts such as rubber mounts, plastic mounts, metal mounts, or any other material. The compressor mounts may be configured to dampen vibrations of the compressor or to allow slight movement of the compressor 30 during operation.

In the illustrated embodiment, the gas compressor 30 intakes and compresses air directly from the atmosphere, such as via a filter, and may use one of the vents 28 as an intake vent to enable air to flow into the compressor 30. The gas used by the compressor 30 may be a gas, such as nitrogen, argon, hydrogen, oxygen, or any combination thereof. Accordingly, the gas compressor 30 may provide a direct supply of compressed gas (e.g., air) on-demand to a desired application, such as the plasma torch 14. Thus, the torch 14 may consume air directly from the unit 12 without the air being compressed into a tank.

To ensure reliability and performance for the system 10, various temperature sensors (e.g., thermistors) may be included inside the enclosure 20 to measure the temperature of various components. For example, the system 10 may include a temperature sensor configured to measure the temperature of the motor 32, the compressor 30, the power electronics 34, atmospheric air, and so forth. In addition to each temperature sensor, the system 10 may include control and/or monitoring logic to receive signals from the temperature sensors and perform the appropriate action or indication. For example, if the signal from one or more of the temperature sensors (e.g., thermistors) exceeds a threshold temperature or voltage for a component, then the control and monitoring logic may provide a visual warning by activating a LED or LCD 42 on the control panel 38. If the signal from a temperature sensor (e.g., thermistor) exceeds another threshold temperature or voltage and/or the signal remains above the threshold for a specific duration, then the control and monitoring logic may shutdown the system 10 or that component. The control and monitoring logic may prevent use of the system 10 until the signals from the temperature sensors fall below the threshold levels.

For example, the system 10 may include control circuitry in the vicinity of the control panel 34. In one embodiment, the control circuitry may include a processor, memory, and software code configured to control and or coordinate operation of the system 10.

The system 10 may include cooling components such as the heat sinks 37 and may include active cooling via the fan 36. The heat sink 37 may be mounted such that airflow from the fan 36 circulates air around the heat sink 37, further enhancing the cooling capability of the heat sink 37. As discussed above, additional fans may be included in other locations in the system 10. Similarly, additional heat sinks may be placed inside the system 10 depending on those areas that need passive cooling and/or cannot be cooled by any of the fans in the system 10. Thus, in other embodiments, the system 10 may include any number and combination of active and passive cooling components.

During operation of the system 10, a user first connects the system to a power source, such as a wall socket, via the power cable (not shown). A user may then turn on the system 10 via the user input 40. The compressor 30, fan 36, and other components of the system 12 receive power from the power electronics 34 and begin operation after the user input is activated and the control circuitry calls for operation. A user then attaches the clamp 16 to a work piece (e.g., metal or other material) to be cut. To begin cutting the work piece, the user places the cutting torch 14 adjacent the work piece and activates the trigger 46, which may involve raising a locking mechanism to free the trigger 46 before depressing the trigger 46. Compressed gas from the gas compressor 30 passes through the cooling coils 60 and 61, through the torch cable 15, and out the tip 48 of the torch 14. As discussed above, a pilot current may be supplied between a moveable electrode and the nozzle of the torch 14, thus establishing a pilot arc when the moveable electrode is pushed away from the nozzle of the torch 14 by the gas supplied by the compressor 32. As the electrode moves away from the nozzle of the torch, gas flowing through the torch 14 is energized into a plasma jet which in turn transfers the arc to the work piece.

The electrical arc heats up the gas from the compressor 30, converting it to plasma that is hot enough to cut the work piece. As the user moves the torch 14 across the work piece by dragging, using a drag shield, standoff guide, or the like, the material is cut as the plasma moves through the material. The thickness of the material being cut may be limited by the power of the system 10, the output of the compressor 30, and the torch 14. In addition to supplying the plasma, the compressed gas from the compressor 30 cools the torch 14 and blows away molten material (e.g., molten metal). At the end of the cut, the user releases the trigger 46 of the torch 14. Gas may continue to flow through the torch 14 for a period of time sufficient to cool the consumables, in a state known as "postflow." The postflow cools the torch 14 and ensures that any remaining material is blown away. After postflow, a user may shutdown the system 10 via one or more user inputs 40 on the control panel 38.

Referring now in more detail to the multi-stage compressor 30 as depicted in FIG. 2, operation of the multi-stage compressor 30 includes air flow through a series of pipes and cooling coils 60 and 61 before exiting through the torch 14. For example, in one embodiment, the compressor 30 has two compression chambers 70 and 72 in series. Initially, the compressor intakes air into the first compression chamber 70. After the first stage of compression, compressed air then passes through a first tube 74 to a cooling coil 60. After passing through a cooling coil 60, the air enters the second chamber 72 for the second stage of compression. After a second stage of compression in the second chamber 72, the air enters a second cooling coil 61 for further cooling. The cooling coils 60 and 61 provide removal of heat after the first and second compression stages have compressed the gas. After exiting the cooling coil 61, the compressed gas is then passed through the torch cable 15 to the torch 14. In alternate embodiments, as discussed further below, the compression chambers 70 and 72 may operate in parallel.

In one embodiment, the first chamber 70 and the second chamber compression cycles may run in-phase, such that the both the first chamber 70 and second chamber 72 are intaking and expanding at the same time. In other embodiments, the first chamber 70 may run slightly or substantially out-of-phase with the second chamber 72. For example, in some embodiments the first chamber may run 5, 10, 15, 20, 25 or 30 degrees out of phase with the second chamber 72.

In one embodiment, the multi-stage (e.g., two-stage) compressor may output at least about 70 psi at about 6.5 standard cubic feet per minute (scfm). In such an embodiment, the first stage of the multi-stage compressor 30 may compress a gas from atmospheric pressure (about 14 psi) to about 45 psi, and the second stage may compress the gas from about 45 psi to about 70 psi. In one embodiment, the two-stage compressor 30 may be a WOB-L® piston compressor manufactured by Thomas Products Division of Sheboygan, Wis. In such an embodiment, each compression chamber 70 and 72 may use a connection rod fixed at the head of the piston and the crankshaft such that the piston rotates in the chamber as it moves up and down. In such an embodiment, the service life and output of the two-stage compressor may be affected by the cup seal (seal between the piston and chamber walls), and the cup seal may be selected to obtain a desired service life for the compressor 30.

Figure 3:
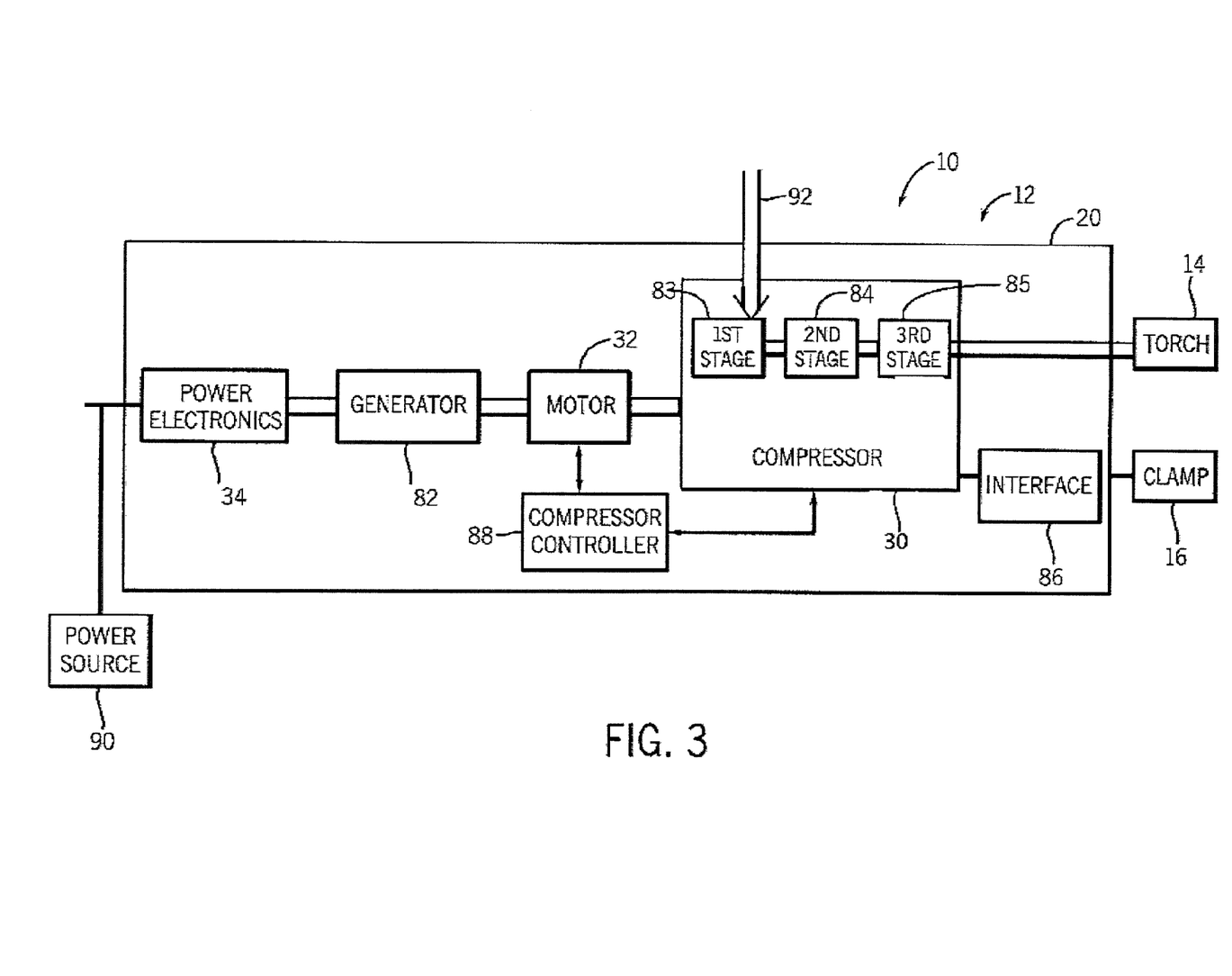
FIG. 3 is a block diagram of a plasma cutting system having a multi-stage compressor in accordance with an embodiment of the present invention.

FIG. 3 is a block diagram of the two-stage compressor system within the plasma cutting system 10 in accordance with an embodiment of the present invention. The illustrated embodiment includes the power electronics 34, a power generator 82, the motor 32, the compressor 30 having first, second, and third stages 83, 84, and 85, an interface 86; and a compressor controller 88.

The illustrated system 10 may be connected to a power source 90, such as a power grid or a power generator. The compressor 30 is driven by the motor 32, which may be controlled by the compressor controller 88. As discussed above, the motor 32 may be an electric motor, such as a DC or AC motor that may include brushed, brushless, switched, reluctance, or any other suitable type of motor, or a gas combustion engine. For example, the motor 32 may include a two-stroke or four-stroke spark-ignition engine, which includes one or more reciprocating piston in cylinder assemblies, a carburetor or fuel injection system, and so forth. Some embodiments of the system 10 may include the power generator 82 built-in or integrally disposed within the enclosure 20 of the power unit 12. Thus, the motor 32 may drive both the compressor 30 and the electrical generator 82, thereby making the power unit 12 completely portable for use in remote locations. However, other embodiments may exclude the generator 82 to reduce the size, weight, and cost of the power unit 12. Additionally, power electronics 34 provide the power management functions for the system 10. In some embodiments, the power electronics 34 include a plasma cutting circuit, a welding circuit, a power conditioning circuit, a user input/interface circuit, a power generator circuit (e.g., if the unit 12 includes the generator 82), a multi-stage compressor control circuit, or any combination thereof.

As discussed above, the compressor 30 may be a multi-stage compressor, such as a two-stage compressor as shown in FIG. 3. An air intake 92 may allow the compressor to intake air from outside the enclosure 20 of the system 10. The air passes sequentially through the first stage 83 and then the second stage 84 before passing to the torch 14. However, the compressor 30 may have any number of compression stages, such as 1, 2, 3, 4, 5, 6, 7, 8, 9, 10, or more. However, in one embodiment, the multiple stages (e.g., stages 83 and 84) may always work together to provide the output pressure/flow to the torch 14. In either case, the multi-stage design of the compressor 30 may substantially reduced noise, heat generation, and power consumption (e.g., 25 to 35% less power consumption). Again, as described above, cooling coils, filters, or other components may be used downstream of the compressor 30 to cool or condition the compressed air before it passes to the torch 14.

Figure 4:
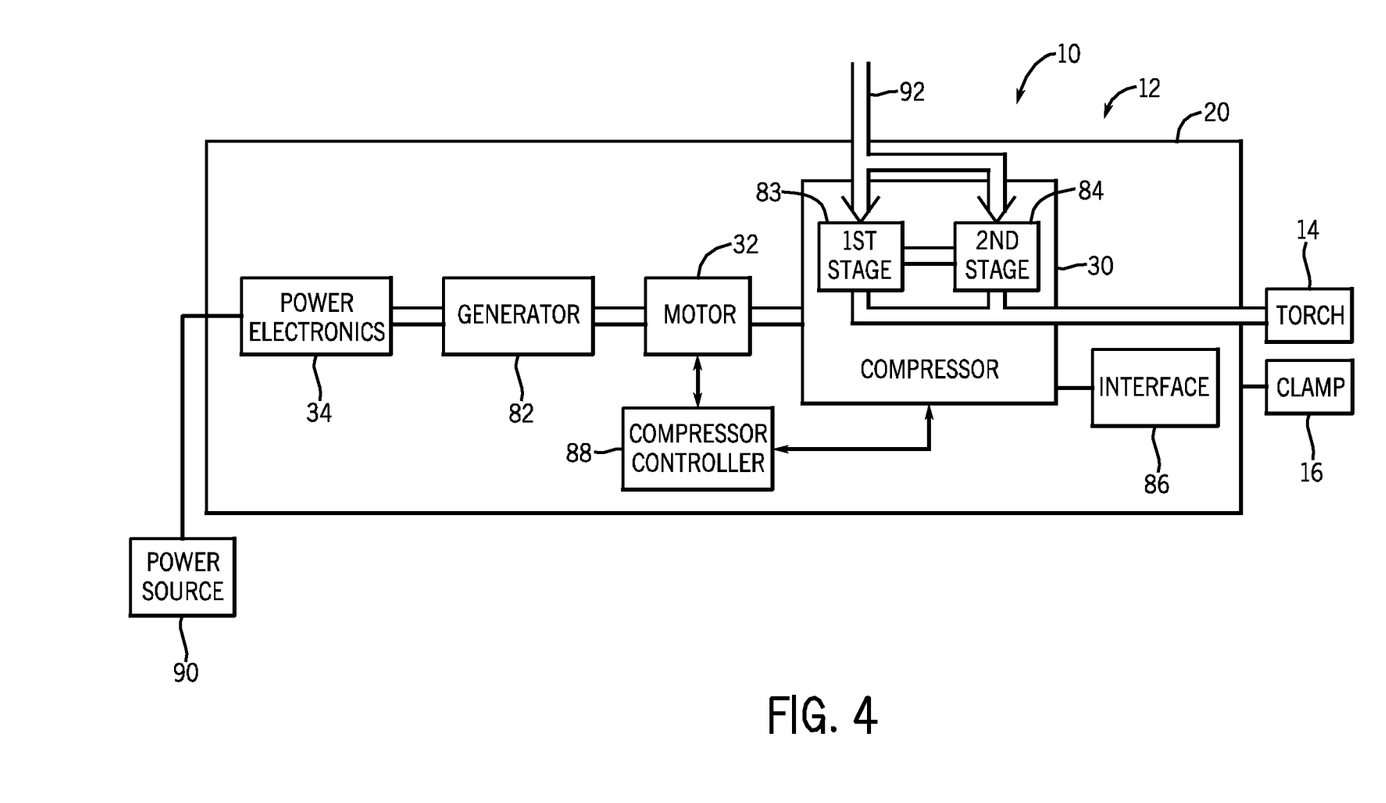
FIG. 4 is a block diagram of a plasma cutting system having a multi-stage compressor in accordance with another embodiment of the present invention.

FIG. 4 is a block diagram of the two-stage compressor system within the plasma cutting system 10 in accordance with another embodiment of the present invention. For convenience, the same components and numbering of FIG. 3 are illustrated in FIG. 4. However, in contrast to FIG. 3, the compression stages 83 and 84 of the compressor 30 operate in parallel. For example, initially, the compressor 30 intakes air into both compression stages 83 and 84. The air intake 92 may allow the compressor to intake air from outside the enclosure 20 of the system 10 into the first stage 83 and the second stage 84 in parallel. Compressed air from the first stage 83 joins with the compressed air output of the second chamber 84 before passing to the torch 14. As in other embodiments, the compressor 30 may have any number of compression stages, such as 1, 2, 3, 4, 5, 6, 7, 8, 9, 10, or more. However, in such an embodiment, the multiple stages (e.g., stages 83 and 84) may always work together to provide the output pressure/flow to the torch 14.

It should be appreciated that the multi-stage compressor 30 and torch power unit 12 is applicable to other tools using a gas compressor. For example, an engine-driven welding system that includes an engine, generator, may also use a multi-stage compressor such as the two-stage compressor described herein. Further, an induction heating system, a welding system, a plasma cutting system, or any system that includes or provides compressed air may also implement the multi-stage compressor system described herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
a torch power unit, comprising:
power electronics configured to provide power to a torch;
a compressor having multiple compression stages configured to compress a gas;
a plurality of cooling coils coupled to the compressor, wherein the plurality of cooling coils are configured to cool the gas downstream from at least one stage of the multiple compression stages, and a first cooling coil of the plurality of cooling coils is configured to cool the gas between at least two stages of the multiple compression stages; and
a valve coupled to the compressor, wherein the valve is configured to direct a compressed gas output of the compressor to at least one device coupled to the torch power unit, to detect the at least one device, and to redirect a compressed gas output to the at least one device on-demand.

2. The system of claim 1, wherein the compressor comprises a plurality of compression chambers configured to compress the gas, wherein each of the plurality of compression chambers operates in series with the others of the plurality of compression chambers.

3. The system of claim 1, wherein the compressor is at least a two-stage reciprocating compressor.

4. The system of claim 1, wherein the torch power unit comprises a control panel configured to switch a compressed gas output of the compressor between a plurality of devices based at least in part on an input to the control panel.

5. The system of claim 1, wherein the power electronics comprise a welding circuit, cutting circuit, induction heating circuit, or combination thereof.

6. The system of claim 1, wherein the power electronics comprise a plasma cutting circuit, and the compressor is configured to provide the gas to the torch to generate a plasma to cut a work piece.

7. The system of claim 1, wherein the torch power unit comprises an electrical generator.

8. The system of claim 1, wherein the plurality of cooling coils comprises a second cooling coil coupled to a downstream end of the compressor.

9. The system of claim 1, wherein the at least one device comprises the torch or a tool.

10. The system of claim 1, wherein the valve comprises one of a 3-way solenoid valve or a 4-way solenoid valve.

11. A method of operation, comprising:
compressing a gas via a multi-stage compressor in a torch power unit to provide a compressed gas, wherein compressing the gas comprises compressing the gas in a first chamber and a second chamber, and cooling the gas via at least one cooling coil after compression in the first chamber and before compression in the second chamber;
receiving the gas through a valve coupled to the compressor;
detecting a tool coupled to the valve;
outputting the compressed gas from the torch power unit for supply to a plasma cutting torch coupled to the valve; and
outputting a power from the torch power unit for supply to the plasma cutting torch at least partially based on the detected tool.

12. The method of claim 11, wherein compressing the gas comprises cooling the gas after compression in the second chamber.

13. The method of claim 11, comprising controlling the compressed gas and the power output by the torch power unit to control a plasma generated at the plasma cutting torch.

14. The method of claim 11, comprising generating an arc between the plasma cutting torch and a workpiece using the power, generating the plasma with the arc and the gas at the plasma cutting torch, and cutting the workpiece with the plasma.

15. The method of claim 11, comprising switching the outputting of the compressed gas between the plasma cutting torch and the detected tool on-demand based on the detected tool.

16. A method of manufacturing a torch power unit, comprising:
   providing a multi-stage compressor for a torch power unit;
   coupling at least one cooling coil to the multi-stage compressor, wherein the multi-stage compressor is configured to compress gas via a plurality of compression chambers, and the at least one cooling coil is configured to cool the gas between sequential chambers of the plurality of compression chambers;
   mounting the multi-stage compressor and the at least one cooling coil inside an enclosure of the torch power unit; and
   mounting a valve coupled to the compressor, wherein the valve is configured to direct a compressed gas output of the compressor to at least one device coupled to the torch power unit, to detect the at least one device, and to redirect a compressed gas output to the at least one device on-demand.

17. The method of claim 16, wherein the at least one cooling coil is configured to cool the gas downstream of the plurality of compression chambers of the multi-stage compressor.

18. The method of claim 16, comprising switching on-demand a compressed gas output of the multi-stage compressor between a plurality of tools coupled to the valve, wherein the plurality of tools comprises a plasma torch.

19. The method of claim 16, comprising mounting a welding circuit, a cutting circuit, or both, inside the enclosure.

20. A system, comprising:
   a torch power unit, comprising:
      a plasma circuit configured to provide power to a plasma torch;
      a multi-stage compressor configured to compress a gas in a plurality of stages to provide a compressed gas to the plasma torch, wherein the system is configured to control the compressed gas and the power output by the torch power unit to control a plasma generated at the plasma torch;
      at least one cooling coil configured to cool the gas between at least two stages of the plurality of stages of compression; and
      a valve configured to detect a tool and to direct the gas to the plasma torch or to the tool based at least in part on the detected tool.

21. The system of claim 1, wherein the compressor comprises at least three compression stages.

22. The system of claim 1, wherein the multiple compression stages comprise at least first and second compression stages that are out of phase with one another.

* * * * *